(No Model.)
L. M. BURBANK.
TOOL OR IMPLEMENT HOLDER.
No. 515,817. Patented Mar. 6, 1894.
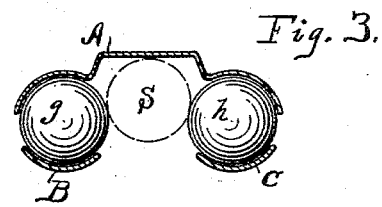
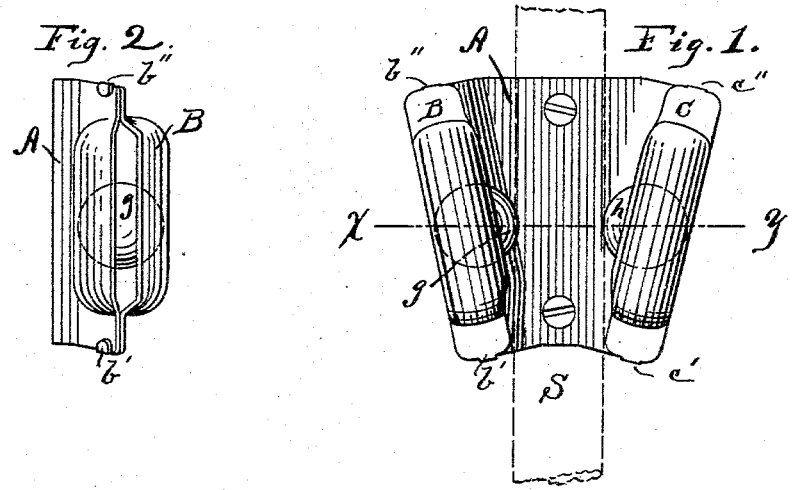
Attest.
Dora Wright
F. W. Sturdivant
Inventor
Lydia M. Burbank
per R. L. Underwood
Atty.

UNITED STATES PATENT OFFICE.

LYDIA M. BURBANK, OF TOLEDO, OHIO.

TOOL OR IMPLEMENT HOLDER.

SPECIFICATION forming part of Letters Patent No. 515,817, dated March 6, 1894.

Application filed September 7, 1892. Serial No. 445,283. (No model.)

*To all whom it may concern:*

Be it known that I, LYDIA M. BURBANK, a citizen of the United States, and a resident of the city of Toledo, in the county of Lucas and State of Ohio, have invented a new and useful Improvement in Tool or Implement Holders, of which the following is a specification.

My invention relates to holders suitable to be fastened to a wall or to the side of a tool case, for holding a broom, a lawn rake, a chisel, a file, or any similar implement or tool with a similar handle.

The object of this invention is to provide a simple device that will be convenient to use, and effective in operation.

In the drawings similar letters of reference refer to similar parts throughout.

Figure 1 is a front elevation. Fig. 2 is a side elevation, and Fig. 3 is a sectional view on the line of X Y of Fig. 1.

This tool holder consists of a body "A" which may be a casting but I prefer to stamp it into shape from sheet metal of two parts "B" and "C" which may be named brackets, and which may also be cast, but I prefer to stamp them into shape from sheet metal, and of two spheres which may be metal or any suitable substance. Bracket "B" when stamped is fastened to body "A" by means of two clips "b" "b" which are bent over the edge of body "A" and into small notches in the edge thereof, thereby preventing any displacement of one from the other. Bracket "C" is fastened to body "A" by two clips "c" "c" which are similar to clips "b" "b." In fact I prefer to make the brackets B and C exact duplicates of each other on account of lessening the cost of manufacture. The body A and brackets B inclose a sphere, g, shown more clearly in Fig. 3. While body A and bracket, C, inclose another sphere "h" the spheres, g, and "h" each have room to move a limited distance in a direction oblique to each other and to a central vertical line as shown in Fig. 1. The dotted lines, S, in Fig. 1 and dotted circles S in Fig. 3 represent a handle s being held.

In operation a handle is placed against the front of the spheres, slightly raised and pressed back until it passes between the spheres and back against body "A" when it may be released by the hand, and will remain in position. When the body A, and brackets, B, and C, are made by casting, then it is not practical to use the clips "b b" and "c c" but the parts may be drilled and riveted together.

What I claim is—

In a tool and implement holder, a plate having angled wings, an elongated depression and a recess at the top and bottom of each wing, a sphere in the depressions, and a retaining bracket secured to the wings, having lugs which engage in the recesses to hold the same in position, whereby a handle pressed between said spheres will be held securely.

LYDIA M. BURBANK.

Witnesses:
F. W. STURDIVANT,
DORA WRIGHT.